(12) United States Patent
Xu

(10) Patent No.: US 10,371,052 B2
(45) Date of Patent: Aug. 6, 2019

(54) INTEGRATED THERMAL MANAGEMENT WITH NACELLE LAMINAR FLOW CONTROL FOR GEARED ARCHITECTURE GAS TURBINE ENGINE

(71) Applicant: UNITED TECHNOLOGIES CORPORATION, Hartford, CT (US)

(72) Inventor: JinQuan Xu, Groton, CT (US)

(73) Assignee: United Technologies Corporation, Farmington, CT (US)

( * ) Notice: Subject to any disclaimer, the term of this patent is extended or adjusted under 35 U.S.C. 154(b) by 1004 days.

(21) Appl. No.: 14/768,798

(22) PCT Filed: Feb. 25, 2014

(86) PCT No.: PCT/US2014/018323
§ 371 (c)(1),
(2) Date: Aug. 19, 2015

(87) PCT Pub. No.: WO2014/134040
PCT Pub. Date: Sep. 4, 2014

(65) Prior Publication Data
US 2015/0377130 A1    Dec. 31, 2015

Related U.S. Application Data

(60) Provisional application No. 61/770,714, filed on Feb. 28, 2013.

(51) Int. Cl.
| | | |
|---|---|---|
| *F02C 7/047* | (2006.01) | |
| *F02C 7/14* | (2006.01) | |
| *F02C 7/12* | (2006.01) | |
| *F02K 3/06* | (2006.01) | |
| *F02C 7/36* | (2006.01) | |
| *F02C 7/045* | (2006.01) | |

(52) U.S. Cl.
CPC ............... *F02C 7/047* (2013.01); *F02C 7/12* (2013.01); *F02C 7/14* (2013.01); *F02C 7/36* (2013.01); *F02K 3/06* (2013.01); *F02C 7/045* (2013.01); *F05D 2260/40311* (2013.01); *Y02T 50/675* (2013.01)

(58) Field of Classification Search
CPC .... F02C 7/047; F02C 7/12; F02C 7/14; F02C 7/36; F02K 3/06; F05D 2260/40311
See application file for complete search history.

(56) References Cited

U.S. PATENT DOCUMENTS 2,435,990 A * 2/1948 Weiler .................... F02C 7/047
60/267
3,734,639 A * 5/1973 Short ...................... F01D 5/185
415/114

(Continued)

FOREIGN PATENT DOCUMENTS

GB    1018538 A    1/1966

OTHER PUBLICATIONS

European Office Action dated Nov. 13, 2018 for corresponding European Patent Application No. 14756718.4.

*Primary Examiner* — Steven M Sutherland
(74) *Attorney, Agent, or Firm* — Bachman & LaPointe, P.C.

(57) ABSTRACT

A thermal management system for a gas turbine engine includes a heat exchanger in fluid communication with a geared architecture and a heating compartment.

17 Claims, 2 Drawing Sheets

(56) References Cited

U.S. PATENT DOCUMENTS

| | | | |
|---|---|---|---|
| 3,797,561 A | | 3/1974 | Clark et al. |
| 3,834,157 A | | 9/1974 | Hoffmann |
| 4,782,658 A | | 11/1988 | Perry |
| 4,914,904 A | * | 4/1990 | Parnes .................... F01D 9/065 60/226.1 |
| 6,990,797 B2 | * | 1/2006 | Venkataramani ....... F02C 7/047 60/204 |
| 7,131,612 B2 | * | 11/2006 | Baptist .................. B64D 15/06 244/134 R |
| 7,398,641 B2 | * | 7/2008 | Stretton .................. F02C 7/047 60/39.093 |
| 7,631,485 B2 | | 12/2009 | Suciu et al. |
| 8,210,801 B2 | | 7/2012 | Ballard, Jr. et al. |
| 2005/0150204 A1 | | 7/2005 | Stretton et al. |
| 2006/0042225 A1 | | 3/2006 | Bruno et al. |
| 2007/0240427 A1 | | 10/2007 | Ullyott |
| 2009/0188234 A1 | | 7/2009 | Suciu et al. |
| 2010/0294597 A1 | * | 11/2010 | Parnin .................... F01D 25/18 184/6.1 |
| 2012/0112575 A1 | | 5/2012 | Blewett et al. |

\* cited by examiner

INTEGRATED THERMAL MANAGEMENT WITH NACELLE LAMINAR FLOW CONTROL FOR GEARED ARCHITECTURE GAS TURBINE ENGINE

This application claims priority to U.S. Patent Application No. 61/770,714 filed Feb. 28, 2013.

BACKGROUND

The present disclosure relates to gas turbine engines, and in particular, to a thermal management system therefor.

Gas turbine engines, such as those which power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

Aero engine thermal management systems typically include heat exchangers and associated equipment which exchange engine heat with an airflow or fuel flow. The gas turbine engine architecture typically dictates thermal management systems and geared architecture engines may typically utilize additional thermal management system components.

SUMMARY

A thermal management system for a gas turbine engine according to one disclosed non-limiting embodiment of the present disclosure includes a heat exchanger in fluid communication with a geared architecture and a heating compartment.

A further embodiment of the present disclosure includes, wherein the heating compartment is within a nacelle.

A further embodiment of any of the foregoing embodiments of the present disclosure includes, wherein the heating compartment is within a fan nacelle.

A further embodiment of any of the foregoing embodiments of the present disclosure includes, wherein the heating compartment is within an inlet of a nacelle.

A further embodiment of any of the foregoing embodiments of the present disclosure includes, wherein the heat exchanger is in fluid communication with the geared architecture and the heating compartment via a heat exchange fluid.

A further embodiment of any of the foregoing embodiments of the present disclosure includes, wherein the heat exchanger is in fluid communication with the geared architecture through a fluid plenum.

A further embodiment of any of the foregoing embodiments of the present disclosure includes, wherein the fluid plenum at least partially surrounds the geared architecture.

A further embodiment of any of the foregoing embodiments of the present disclosure includes, wherein heat exchanger is in fluid communication with an oil system of the geared architecture.

A nacelle for a gas turbine engine according to another disclosed non-limiting embodiment of the present disclosure includes a heating compartment within the nacelle and a heat exchanger in fluid communication with the heating compartment.

A further embodiment of any of the foregoing embodiments of the present disclosure includes, wherein the heating compartment is within an inlet of the nacelle.

A further embodiment of any of the foregoing embodiments of the present disclosure includes, wherein the heat exchanger is in fluid communication with a geared architecture through a fluid plenum.

A further embodiment of any of the foregoing embodiments of the present disclosure includes, wherein the fluid plenum at least partially surrounds the geared architecture.

A further embodiment of any of the foregoing embodiments of the present disclosure includes, wherein the heat exchanger is in fluid communication with an oil system of a geared architecture.

A further embodiment of any of the foregoing embodiments of the present disclosure includes, wherein the nacelle is a fan nacelle.

A method of thermal management for a gas turbine engine according to another disclosed non-limiting embodiment of the present disclosure includes vaporizing a heat exchange fluid with heat from a geared architecture; and communicating the vaporized heat exchange to a heating compartment.

A further embodiment of any of the foregoing embodiments of the present disclosure includes locating the heating compartment within a nacelle.

A further embodiment of any of the foregoing embodiments of the present disclosure includes locating the heating compartment within an inlet of a nacelle.

A further embodiment of any of the foregoing embodiments of the present disclosure includes deicing an inlet of a nacelle.

A further embodiment of any of the foregoing embodiments of the present disclosure includes generating a thermal gradient that encourages a sustained stabilization of a boundary-layer over a nacelle to facilitate laminar airflow.

A further embodiment of any of the foregoing embodiments of the present disclosure includes generating a thermal gradient that encourages a sustained stabilization of a boundary-layer over an inlet of a nacelle to facilitate laminar airflow.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
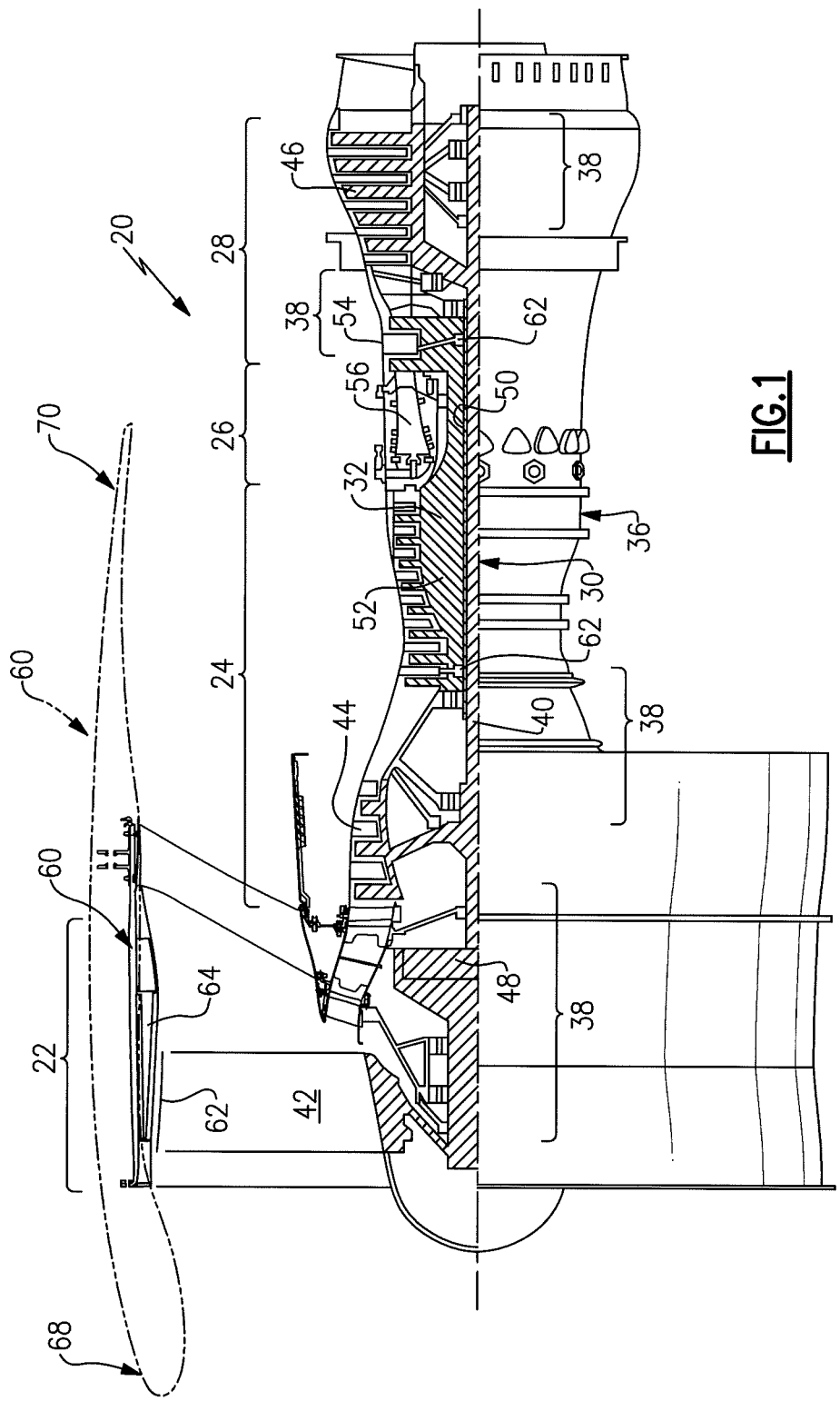
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the LPC 44 and LPT 46 to render increased pressure in a relatively few number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The relatively low Fan Pressure Ratio according to one example gas turbine engine 20 is less than 1.45. Low Corrected Fan Tip Speed is the actual fan tip speed divided by an industry standard temperature correction of ("Tram"/ 518.7)$^{0.5}$. The Low Corrected Fan Tip Speed according to one example gas turbine engine 20 is less than about 1150 fps (351 m/s).

The fan section 22 generally includes a fan containment case 60 within which the fan blades 42 are contained. Tips 62 of the fan blades 42 run in close proximity to an inboard surface 64 of the fan containment case 60. The fan containment case 60 is enclosed within an aerodynamic fan nacelle 66 (illustrated schematically). The nacelle 66 extends from an upstream inlet section 68 to a trailing edge section 70. The trailing edge section 70 may include a Variable Area Fan Nozzle (VAFN) system (not shown) and/or a Thrust reverser system (not shown).

Figure 2:
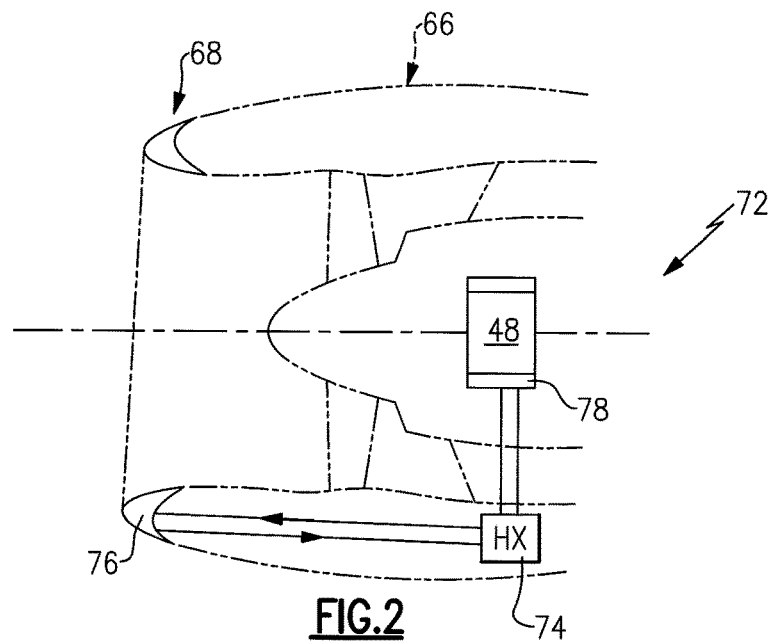
FIG. 2 is a schematic view of a thermal management system according to one disclosed non-limiting embodiment.

With reference to FIG. 2, a thermal management system 72 generally includes a heat exchanger 74 in fluid communication with the geared architecture 48 and a heating compartment 76 within the inlet section 68. It should be appreciated that various additional and alternative components may be provided.

Figure 3:
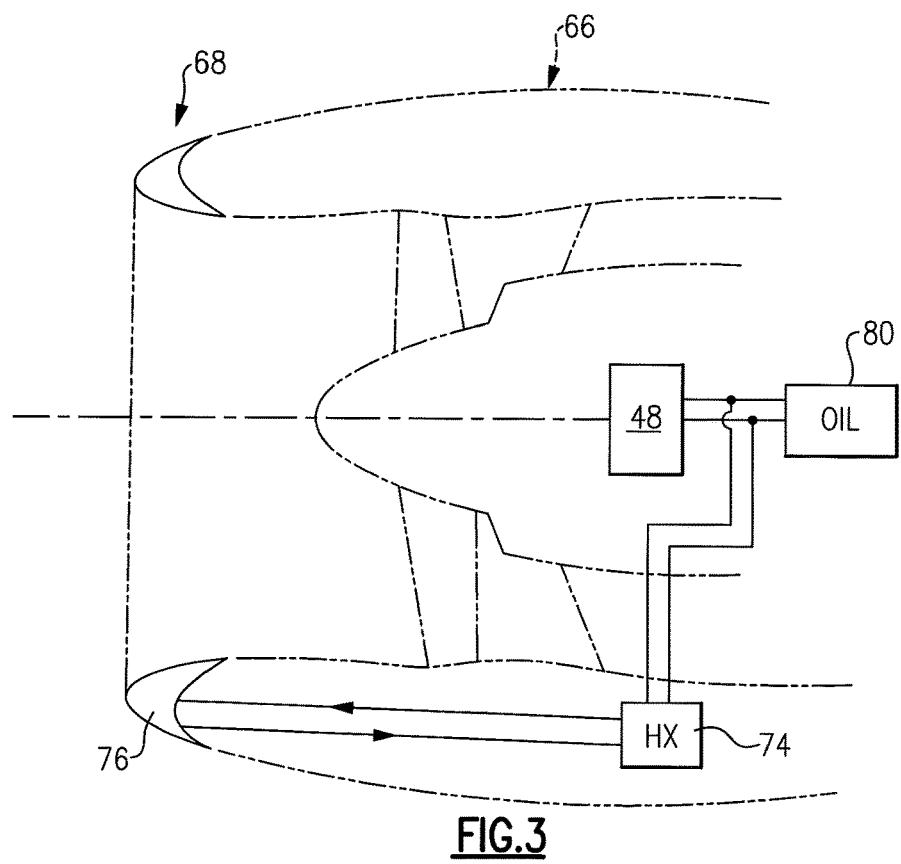
FIG. 3 is a schematic view of a thermal management system according to one disclosed non-limiting embodiment.

In one disclosed non-limiting embodiment, the heat exchanger 74 may be in fluid communication with the geared architecture 48 though a fluid plenum 78, for example, lubricant oil for the geared architecture 48, that at least partially surround the geared architecture 48 to receive heat therefrom. Alternatively, the heat exchanger 74 is in fluid communication with an oil system 80 (FIG. 3) for the geared architecture 48. That is, the heat exchanger 74 may be a fluid-fluid heat exchanger between for example, a heat exchange fluid and the oil in the oil system 80. It should be appreciated that various fluids may be utilized.

A heat exchange fluid such as water, antifreeze or other fluid is communicated through the heat exchanger 74. In one disclosed non-limiting embodiment, the heat exchange fluid remains liquid between about −112-212 F (−80 C to 100 C) then vaporizes above about 212 F (100 C). Heat generated by the geared architecture 48 vaporizes the heat exchange fluid for communication through the heat exchanger 74 and to the heating compartment 76 as a vapor. The vapor thereby heats the inlet section 68 and condenses at least partially to a liquid within the heating compartment 76 due at least in part to the relatively cold airflow over the nacelle 66. The liquid and vapor heat exchange fluid is then returned to the heat exchanger 74 thence again into heat exchange relationship with the geared architecture 48 as a liquid. The geared architecture 48 operates as an essentially closed loop heat pipe type system.

The thermal management system 72 provides thermal management of the geared architecture 48 and beneficially heats the inlet section 68. Heating of the inlet section 68 generates a thermal gradient that encourages a sustained stabilization of a boundary-layer airflow over the inlet section 68 of the nacelle 66 to facilitate laminar flow. Laminar flow is achieved by the reduction of the magnitude of disturbances and instabilities in the boundary-layer.

The thermal management system 72 also beneficially heats the inlet section 68 and thereby operates as an anti-ice system.

Although the disclosed non-limiting embodiment are applied to a generally circular aircraft engine nacelle, numerous other environments such as low-sweep aircraft wings, low-sweep aircraft vertical tails, and the like will also benefit herefrom and application to an engine nacelle should be considered illustrative and not limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A thermal management system for a gas turbine engine comprising:
    a geared architecture to drive a fan at a lower speed than a low spool;
    a heating compartment located within an inlet of a fan nacelle, the fan nacelle surrounds the fan; and
    a heat exchanger in fluid communication with said geared architecture and said heating compartment.

2. The system as recited in claim 1, wherein said heat exchanger is in fluid communication with said geared architecture and said heating compartment via a heat exchange fluid.

3. The system as recited in claim 1, wherein said heat exchanger is in fluid communication with said geared architecture through a fluid plenum.

4. The system as recited in claim 3, wherein said fluid plenum at least partially surrounds said geared architecture.

5. The system as recited in claim 1, wherein the heat exchanger is in fluid communication with an oil system of said geared architecture.

6. The system as recited in claim 1, wherein said fan and said low spool are defined along an engine axis.

7. The system as recited in claim 6, further comprising a high spool along the engine axis.

8. A gas turbine engine comprising:
    a geared architecture to drive a fan at a lower speed than a low spool, wherein said fan and said low spool are defined along an engine axis;
    a heating compartment within an inlet of a nacelle, said fan located within said nacelle; and
    a heat exchanger in fluid communication with said heating compartment, the heat exchanger located within the nacelle generating a thermal gradient that encourages a sustained stabilization of a boundary-layer adjacent to the nacelle;
    a fluid plenum that at least partially surrounds the geared architecture, said heat exchanger in fluid communication with said geared architecture.

9. The gas turbine engine as recited in claim 8, wherein said nacelle is a fan nacelle.

10. A method of thermal management for a gas turbine engine, comprising:
    vaporizing a heat exchange fluid to form a vaporized heat exchange fluid with heat from a geared architecture that drives a fan at a lower speed than a low spool, wherein said fan and said low spool are defined along an engine axis; and
    communicating the vaporized heat exchange fluid to a heating compartment located within an inlet of a nacelle.

11. The method as recited in claim 10, further comprising deicing the inlet of the nacelle with the vaporized heat exchange fluid.

12. The method as recited in claim 10, further comprising generating a thermal gradient that encourages a sustained stabilization of a boundary-layer over the nacelle to facilitate laminar airflow.

13. The method as recited in claim 10, further comprising generating a thermal gradient that encourages a sustained stabilization of a boundary-layer over the inlet of the nacelle to facilitate laminar airflow.

14. The method as recited in claim 10, further comprising communicating the heat exchange fluid into a fluid plenum that at least partially surrounds the geared architecture.

15. The method as recited in claim 10, wherein vaporizing the heat exchange fluid is performed by heat from the geared architecture.

16. The method as recited in claim 10, further comprising communicating the vaporized heat exchange fluid from the heat exchanger as a vapor.

17. The method as recited in claim 10, further comprising communicating the vaporized heat exchange fluid to the heating compartment as a vapor.

* * * * *